(12) United States Patent
Han et al.

(10) Patent No.: US 8,248,804 B2
(45) Date of Patent: Aug. 21, 2012

(54) SMART JUNCTION BOX FOR SOLAR CELL MODULE

(75) Inventors: Yun Heui Han, Ansan (KR); Hee Chang Rho, Siheung (KR); Hun Ho Kim, Incheon (KR); Yong Soo Yoon, Seoul (KR)

(73) Assignees: Connex Electronics Co., Ltd., Ansan (KR); Yun Heui Han, Ansan (KR); Hee Chang Roh, Siheung (KR)

( * ) Notice: Subject to any disclaimer, the term of this patent is extended or adjusted under 35 U.S.C. 154(b) by 129 days.

(21) Appl. No.: 12/921,156

(22) PCT Filed: Apr. 23, 2010

(86) PCT No.: PCT/KR2010/002584
§ 371 (c)(1),
(2), (4) Date: Sep. 5, 2010

(87) PCT Pub. No.: WO2010/123325
PCT Pub. Date: Oct. 28, 2010

(65) Prior Publication Data
US 2011/0058337 A1    Mar. 10, 2011

(30) Foreign Application Priority Data

Apr. 24, 2009 (KR) .................. 10-2009-0036104
Apr. 24, 2009 (KR) .................. 10-2009-0036105

(51) Int. Cl.
*H05K 7/20* (2006.01)
*H02G 3/16* (2006.01)

(52) U.S. Cl. ........ 361/717; 361/704; 361/710; 361/714; 361/715; 361/831; 165/80.3; 165/104.21; 165/104.33; 165/185; 136/244; 136/251; 174/50; 174/50.5; 174/51; 174/260; 174/520; 439/76.1; 439/709

(58) Field of Classification Search ............. 361/679.46, 361/679.54, 704–712, 714–728, 831, 641; 165/80.3, 104.21, 104.33, 185; 174/50, 50.51–50.56, 174/50.64, 58, 59, 520, 260–267; 439/441, 439/76.1, 76.2, 709, 535, 850, 852, 500, 439/856, 860, 861, 485, 487, 110–116, 212, 439/216; 136/243–245, 248, 251, 291, 293; 700/299; 702/64, 188
See application file for complete search history.

(56) References Cited

U.S. PATENT DOCUMENTS
4,460,232 A * 7/1984 Sotolongo ................. 439/535
(Continued)

FOREIGN PATENT DOCUMENTS
CA    CN201038678 Y  *  3/2008

*Primary Examiner* — Michail V Datskovskiy
(74) *Attorney, Agent, or Firm* — LRK Patent Law Firm

(57) ABSTRACT

The present invention relates to a smart junction box for a solar cell module, and provides a smart junction box for a solar cell module which enables an operator to easily connect and separate ribbon cables using the operation of the levers of pressing units, thereby being able to improve the contact stability of ribbon cables, and which has a heat sink structure, thereby effectively emitting the heat generated by the ribbon cables and the diodes to the outside. For this purpose, the smart junction box for a solar cell module of the present invention includes bus bars for transmitting electricity flowing from ribbon cables; and pressing units for selectively fastening and separating the ribbon cables located on contact portions of the bus bars depending on whether both ends of the lever projected by the manipulation of an operator are inserted into recesses formed in a body.

10 Claims, 18 Drawing Sheets

U.S. PATENT DOCUMENTS

| | | |
|---|---|---|
| 6,344,612 B1 * | 2/2002 | Kuwahara et al. ............. 174/50 |
| 7,097,516 B2 * | 8/2006 | Werner et al. ................. 439/709 |
| 7,134,883 B2 * | 11/2006 | Werner et al. ................. 439/76.1 |
| 7,365,965 B2 * | 4/2008 | Higashikozono et al. .... 361/641 |
| 7,369,398 B2 * | 5/2008 | Higashikozono et al. .... 361/641 |
| 7,530,858 B2 * | 5/2009 | Ma et al. ....................... 439/817 |
| 7,591,690 B1 * | 9/2009 | Chien et al. ................... 439/709 |
| 7,618,265 B2 * | 11/2009 | Rueggen et al. ............. 439/76.1 |
| 7,723,609 B2 * | 5/2010 | Yoshikawa et al. ........... 136/244 |
| 8,003,885 B2 * | 8/2011 | Richter et al. .................. 174/50 |
| 8,083,540 B1 * | 12/2011 | Spicer et al. ................... 439/460 |
| 8,113,853 B2 * | 2/2012 | Coyle et al. ................... 439/76.1 |
| 2008/0115911 A1 * | 5/2008 | Duesterhoeft ........... 165/104.21 |
| 2008/0147335 A1 * | 6/2008 | Adest et al. ..................... 702/64 |
| 2008/0253092 A1 * | 10/2008 | Duesterhoeft et al. ........ 361/710 |
| 2009/0140719 A1 * | 6/2009 | Hasenfus ......................... 324/72 |

* cited by examiner

SMART JUNCTION BOX FOR SOLAR CELL MODULE

TECHNICAL FIELD

The present invention relates to a smart junction box for a solar cell module. In particular, the present invention relates to a smart junction box for a solar cell module which enables an operator to easily connect and separate ribbon cables using the operation of the levers of pressing units, thereby being able to improve the contact stability of ribbon cables. Furthermore, the present invention relates to a smart junction box for a solar cell module which has a heat sink structure in which ribbon cables, diodes, bus bars and heat sink plates are fastened to each other in a surface contact relationship, thereby effectively emitting the heat generated by the ribbon cables and the diodes. Moreover, the present invention relates to an intelligent junction box for a solar cell module in which sensors for detecting current, voltage and temperature are installed inside the junction box and sensed data is reported to an administrator using a smart module and a communication module, thereby being able to rapidly and easily identify and deal with a part in which a problem has occurred.

BACKGROUND ART

Recently, many countries of the world are adopting the agenda of the green growth era, in which the low-carbon green technology and the green industry are utilized as new growth engines, as a new paradigm of national development in order to overcome the climate change crisis caused by the increased use of fossil fuels and the energy and resource crises caused by the increased global population and the rapid growth of the BRIC countries. That is, green growth is the new power of national development which breaks from the fixed idea that the environment and the economy conflict with each other and which maximizes the synergy of both, so that economic growth contributes to improving the environment and the environment is converted into a growth engine, thereby enabling the economy and the environment to form a virtuous circle.

As one of the specific methods for the realization of green growth, photovoltaic power generation is attracting attention as a means for realizing an escape from petroleum and the self-sufficiency of energy. In general, photovoltaic power generation is implemented in the form of a generation method of receiving solar light and directly generating electricity using solar cells made of semiconductor material. That is, photovoltaic power generation is a method of generating electricity by directly converting the light energy of the sun into electrical energy.

A photovoltaic power generation system is configured such that a solar cell module, that is, a solar cell panel, is arranged and installed outside a building and power is supplied from the module to various types of electrical equipment through a connection box, an inverter and a switchboard. Here, the solar cell module receives solar light and then generates Direct Current (DC) electricity. A junction box is required to collect electricity generated by the solar cell module and provide the electricity to the connection box. Such a junction box is connected in series or parallel to a solar cell module, and is fastened to the back of the solar ceil module while watertightness is generally maintained using sealing material. In general, the junction box is connected to the solar cell module using flexible ribbon cables, and collects electricity generated by the solar cell module using the ribbon cables.

Up to now, when ribbon cables are connected to a junction box, the ribbon cables have been connected by applying soldering, inserting ribbon cables after raising driver insertion recesses, or inserting folded ribbon cables into terminal blocks. Soldering deteriorates processing efficiency and makes replacement during post-sale service difficult, and the contact portions of bus bars or the body of a junction box may be damaged because ribbon cables are connected by exerting physical force using a driver so as to insert the ribbon cables into driver insertion recesses. Furthermore, in the case where ribbon cables are folded and then connected, heat is generated due to high contact resistance and contact stability is also low because the ribbon cables are folded and then used, and additional post-processing is required to be performed on the ribbon cables because the ribbon cables should be folded and then connected.

As described above, since the conventional methods are problematic in that the body of a junction box may be damaged during the post-sale service of the junction box and post-processing is required to be performed on ribbon cables, a junction box having a structure which enables the easy connection of ribbon cables is required. Meanwhile, in the conventional junction box, heat is generated in the portions thereof where ribbon cables are connected, so that the junction box requires a heat sink structure which emits heat to the outside.

Accordingly, it is required that an operator can easily connect, ribbon cables and that the contact stability of ribbon cables is provided to allow the ribbon cables to be connected by a predetermined contact pressure while leaving the intrinsic contact areas of the ribbon cables unchanged, and it is also required that there be a heat sink structure capable of effectively emitting the heat generated by internal components to the outside.

Furthermore, with regard to the conventional solar cell modules, since it is possible to track abnormalities occurring in each group of modules when the abnormalities occur, it is difficult to perform management and take action in real time because it is difficult to find the occurrence of an abnormality in each module, with the result that a solution to this is also required.

DISCLOSURE

Technical Problem

Accordingly, the present invention has been made keeping in mind the above problems occurring in the prior art, and the present invention is intended to provide a smart junction box for a solar cell module which enables an operator to easily connect and separate ribbon cables using the operation of the levers of pressing units, thereby being able to improve the contact stability of ribbon cables. Furthermore, the present invention is intended to provide a smart junction box for a solar ceil module which has a heat sink structure in which ribbon cables, diodes, bus bars and heat sink plates are fastened to each other in a surface contact relationship, thereby effectively emitting the heat generated by the ribbon cables and the diodes. Moreover, the present invention is intended to provide an intelligent junction box for a solar cell module in which sensors for detecting current, voltage and temperature are installed inside the junction box and sensed data is reported to an administrator using a smart module and a communication module, thereby being able to rapidly and easily identify and deal with a part in which a problem has occurred.

Technical Solution

In order to accomplish the above objects, the present invention provides a smart junction box for a solar cell module, including bus bars for transmitting electricity flowing from ribbon cables; pressing units for selectively fastening and separating the ribbon cables located on contact portions of the bus bars; diodes each configured to have a hexahedral shape, provided with thermally conductive metal on one surface thereof, disposed so as to be in contact with a corresponding heat sink plate in a surface contact manner, and provided with two terminals so as to be disposed in contact with a corresponding bus bar; heat sink plates disposed in contact with the bus bars, and configured to emit heat conducted through the bus bars and the metal of the diodes to an outside; fastening means for fastening the bus bars, the diodes and the heat sink plates to each other; and external cables for providing electricity transmitted from the bus bars to the outside.

A comb-teeth shaped knurling portion may be formed on a contact portion of each of the bus bars on which a corresponding ribbon cable is located so as to improve reliability of contact between the bus bar and the ribbon cable. Furthermore, each of the ribbon cables may be connected to a solar cell module, so that, electricity flows from the solar cell module.

Each of the pressing units may include an Ω-shaped lever configured to selectively fasten or release a corresponding ribbon cable to or from a corresponding bus bar; a lever fastening part configured to fasten the lever when fastening the ribbon cable; and a metallic moving contact portion provided on a bottom of the pressing unit.

The pressing unit may selectively fasten and separate the ribbon cable depending on whether both ends of the lever are inserted into recesses formed in a body of the smart junction box by manipulation of an operator. A plurality of protrusions may be formed on the metallic moving contact portion to come into contact with the ribbon cable so as to increase reliability of contact between the pressing unit and the ribbon cable.

The diodes may provide bypasses for current transmitted from a corresponding ribbon cable to an external cable when an abnormality occurs in a cell of the solar cell module.

Each of the external cables may be fitted into a ring terminal and fastened to a corresponding bus bar through a through hole of an external cable connection part using a screw.

The external cable connection part may include a rubber cable seal provided on an outer circumference of the external cable to realize waterproofing and a seal retainer fitted on an outside of the cable seal to prevent the cable seal from being separated and to keep the cable seal. waterproof when the external cable is bent.

Furthermore, the smart junction box according to an embodiment of the present invention may further include a sensor module disposed inside the junction box and configured to detect current, voltage and temperature; and a communication module configured to report data detected by the sensor module to an administrator via wireless communication. The sensor module may include a current/voltage sensor and a temperature sensor.

Advantageous Effects

As described above, the present invention has the effect of connecting or separating ribbon cables based on wide contact areas and high contact pressures by bringing the ribbon cable into contact with bus bars using pressing units.

Furthermore, the present invention enables the heat generated by ribbon cables and diodes to be effectively emitted to the outside by forming a heat sink structure in which bus bars, diodes and heat sink plates are fastened to each other in a surface contact relationship.

Furthermore, the present invention enables a junction box to be stably operated by using diodes which bypass current when an abnormality occurs in a cell of a solar cell module.

Furthermore, the present invention enables a junction box to be conveniently serviced because an operator can easily connect, or separate ribbon cables.

Furthermore, the present invention enables a rapid action to be taken by installing a smart module inside a junction box and rapidly providing a report to an administrator in real time when a solar ceil module fails or an abnormality occurs.

MODE FOR INVENTION

The above-described objects, features and advantages will be more apparent from the following embodiments taken in conjunction with the accompanying drawings. The detailed embodiments of the present invention will be described in detail below with reference to the accompanying drawings.

Figure 1:
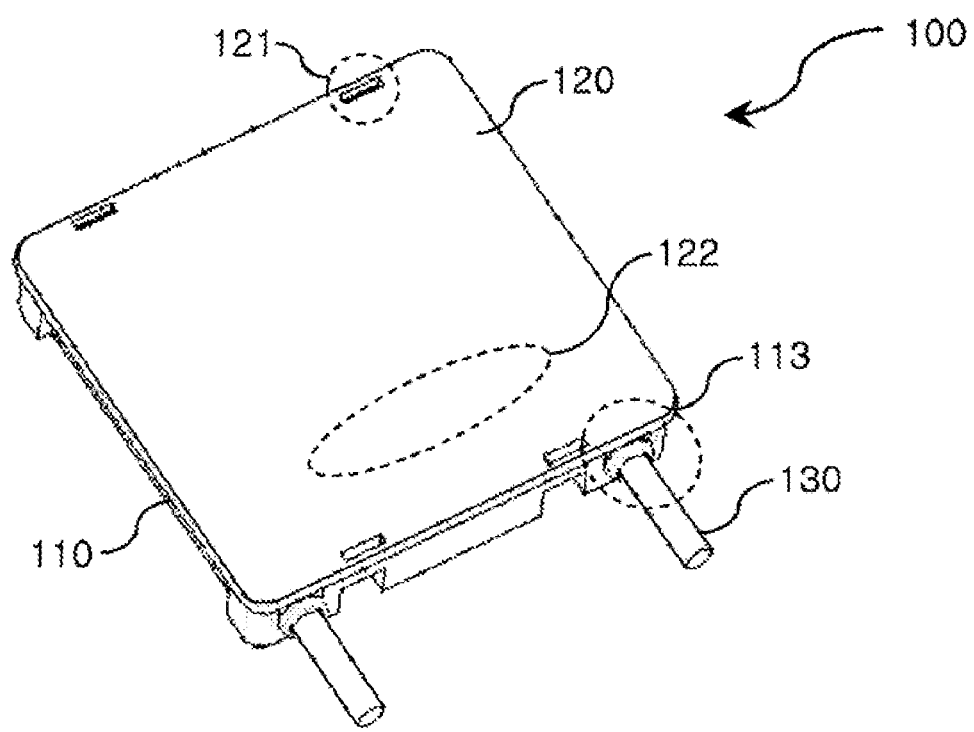
FIG. 1 is a perspective view showing a smart junction box for a solar ceil module according to an embodiment of the present invention.
Figure 2:
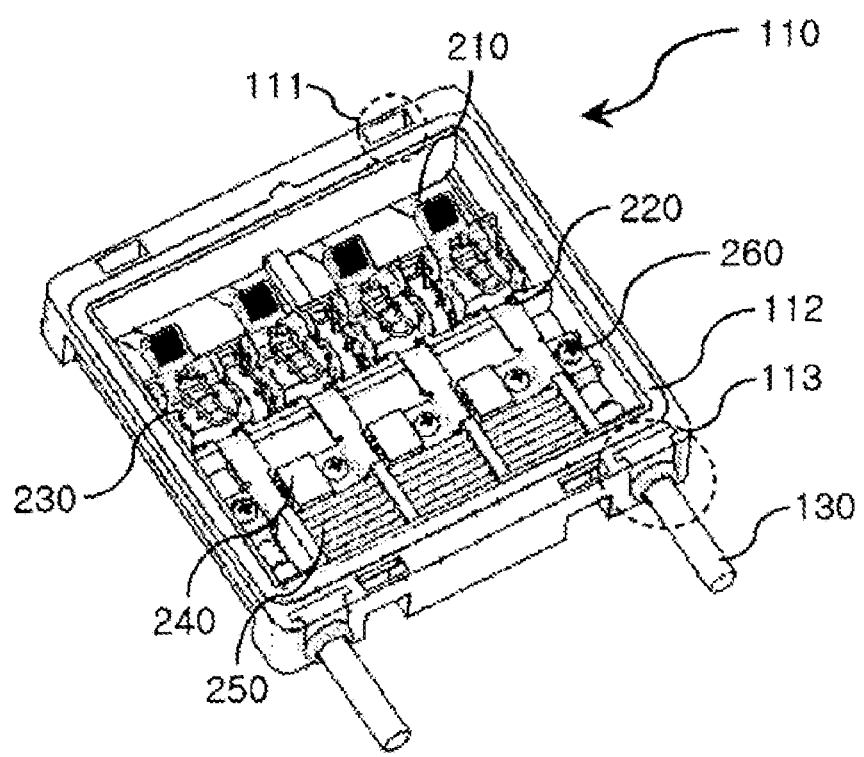
FIG. 2 is a perspective view showing the interior of the smart junction box for a solar cell module according to the embodiment of the present invention.
Figure 3:
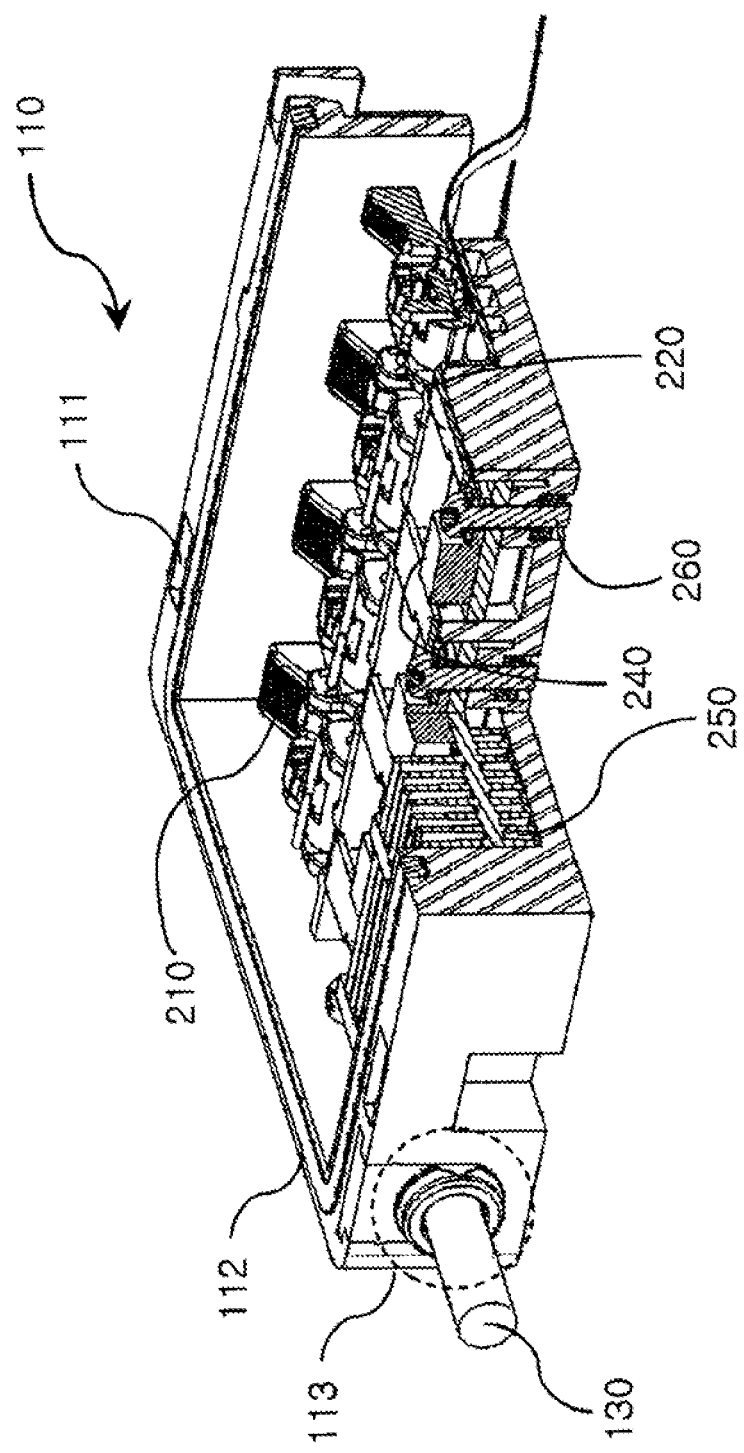
FIG. 3 is a perspective view showing the smart junction box for a solar cell module shown in FIG. 2 with part of the interior thereof cut away therefrom.

FIG. 1 is a perspective view showing a smart junction box for a solar ceil module according to an embodiment of the present invention, FIG. 2 is a perspective view showing the interior of the smart junction box for a solar cell module according to the embodiment of the present invention, and FIG. 3 is a perspective view showing the smart junction box for a solar cell module of FIG. 2 with part of the interior thereof cut away therefrom.

As shown in FIGS. 1 to 3, the junction box 100 for a solar cell module according to the embodiment of the present invention includes a body 110 attached to the back of the solar cell module and configured such that elements of the junction box are mounted thereon, and a cover 120 configured to cover the open top of the body 110. Although the body 110 and the cover 120 may be made of synthetic resin or plastic, including polyphenylene oxide (PPO) or polyphenylene ether (PPE), they are not limited thereto.

Meanwhile, the body 110 and the cover 120 are detachably combined with each other. Multiple locking recesses ill are formed in the periphery of the body 110, and locking fingers 121 are formed in the cover 120 at locations corresponding to those of the locking recesses 111 of the body 110. Accordingly, a user can combine the cover 120 with the body 110 by inserting the locking fingers 121 of the cover 120 into the locking recesses 111 of the body 110 and then causing them to be caught by locking projections. Furthermore, a silicon or rubber sealing member 112 is provided along the periphery of the body 110 or cover 120, so that when the body 110 and the cover 120 are combined with each other, rainwater or impurities cannot infiltrate into the junction box 100 from the outside.

Furthermore, a plurality of through holes 122 for emitting heat from spots on which heat is concentrated (for example, a heat, sink plate, a bypass diode, etc) inside the junction box to the outside may be formed in the cover 120. In the present invention, the number and size of the through holes 122 is not specially limited, and may be appropriately set with the heat dissipation of the junction box taken into consideration. The through holes 122 are provided with selectively-permeable membranes (for example, air-permeable fabrics such as Gore-Tex fabrics) which do not pass relatively large particles, such as rainwater or moisture, therethrough but pass relatively small particles, such as air, therethrough so as to prevent rainwater or moisture from easily infiltrating from the outside. The reason for this is to prevent, rainwater from infiltrating from the outside and to enable the heated air inside the junction box 100 to flow to the outside through the through holes 122 provided with the air-permeable fabrics. Additionally, there may be adopted a structure in which one or more air vents are formed in the lower portions of the sides of the body 110 and the inlets of the air vents are sealed with metallic filters, thereby preventing rainwater or moisture from infiltrating into the structure and enabling external air to flow into the structure.

The junction box 100 for a solar cell module according to an embodiment of the present invention, as shown in FIGS. 2 and 3, includes ribbon cables 210, bus bars 220, pressing units 230, diodes (particularly, bypass diodes 240), heat sink plates 250, fastening means 260, and external cables 130. Using these elements, the junction box 100 of the present invention not only provides the contact stability of the ribbon cables 210, but also has a heat sink structure for emitting the heat generated by the ribbon cable 210 and the bypass diode 240 to the outside.

The above elements, the combination of the elements, and the operating principle will be described in detail below. First, the junction box 100 for a solar cell module according to the present invention can provide the contact stability of the ribbon cables 210 (refer to FIGS. 7 to 9 related to the following description). That is, the junction box 100 for a solar cell module enables the ribbon cables 210 to be brought into contact with or separated from the bus bars 220 disposed on a bottom surface along a casing formed by the body 110 using the spring pin-type pressing units 230 which are selectively fastened or released in the form of hinge structures so as to forcibly bring the ribbon cables 210 into contact with the tops of the bus bars 220. Using this configuration, the ribbon cables 210 can be brought into contact with the bus bars 220 by exerting physical force using a driver or exerting high pressure without deforming the ribbon cables 210, so that the stable contact of the ribbon cables 210 can be achieved.

Thereafter, the junction box 100 for a solar cell module according to the present invention configured to have a heat sink structure for emitting the heat generated by the ribbon cables 210 and the bypass diodes 240 to the outside. That is, the junction box 100 for a solar cell module is configured such that the bus bars 220, the bypass diodes 240 and the heat sink plates 250 are connected in a surface contact relationship, so that the heat generated by the ribbon cables 210 and the bypass diodes 240 is conducted to the heat sink plates 250 and is then emitted. Here, the bus bars 220, the bypass diodes 240 and the heat sink plates 250 are firmly fastened to each other using the fastening means 260, such as bolts or screws, so as to improve contact efficiency. Here, it is preferred that the junction box 100 for a solar cell module be configured such that the above-described through holes 122 of the cover 120 are disposed in portions corresponding to the heat sink plates 250, so that the heat emitted through the heat sink plates 250 can be easily emitted to the outside using a convection process.

Figure 4:
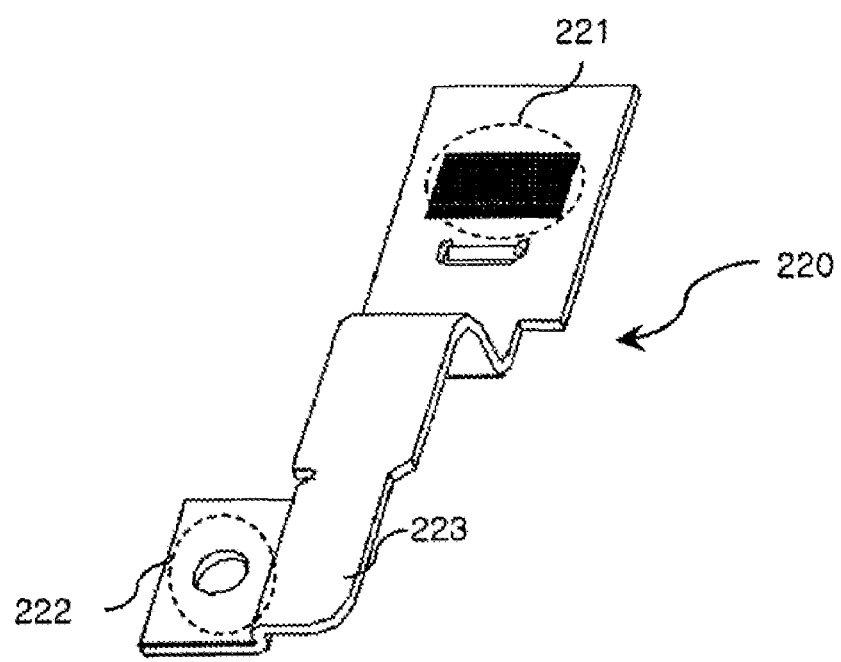
FIG. 4 is a perspective view showing a bus bar of the smart junction box for a solar ceil module shown in FIG. 2.

FIG. 4 is a perspective view showing a bus bar 220 of the smart junction box for a solar ceil module shown in FIG. 2. The bus bars 220 are mounted on the casing formed on the bottom of the body 110, function to transmit electricity flowing from the ribbon cables 210, and function as a heat flow paths. Here, the ribbon cables 210 are connected to the solar cell module (refer to reference numeral 10 of FIGS. 11 to 14), so that electricity flows into the solar cell module.

As shown in FIG. 4, in order to increase the reliability of contact when the ribbon cables 210 are brought into contact with and fastened to the bus bars 220 using the spring pin-type pressing units 230, comb-teeth shaped knurling portions 221 are formed on the portions of the bus bar 220 in contact with the ribbon cables 210 so as to sufficiently cover the areas of the ribbon cables 210. Furthermore, the bus bars 220 are provided with bus bar fastening holes 222 which allow the fastening means 260, such as bolts or nuts, to achieve surface contact when the bypass diodes 240 and the heat sink plates 250 form a heat sink structure. As described above, the bus bars 220 form not only paths which allow electricity flowing from the ribbon cables 210 to flow to the external cables 130, but also paths which allow the heat generated by the ribbon cables 210 and the bypass diodes 240 to be conducted to the heat sink plates 250.

Figure 5:
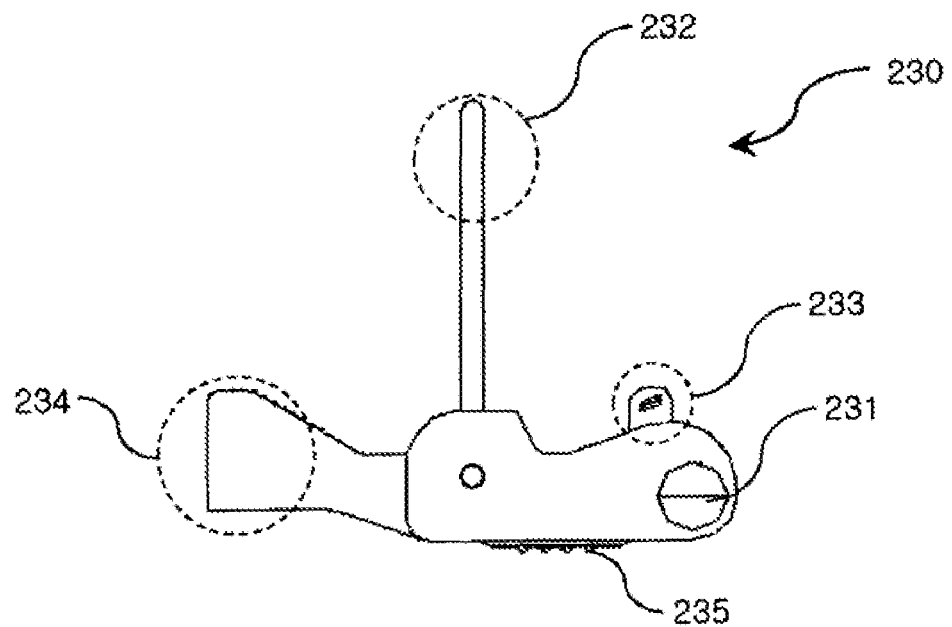
FIG. 5 is a diagram showing a pressing unit of the smart junction box for a solar ceil module shown in FIG. 2.
Figure 6:
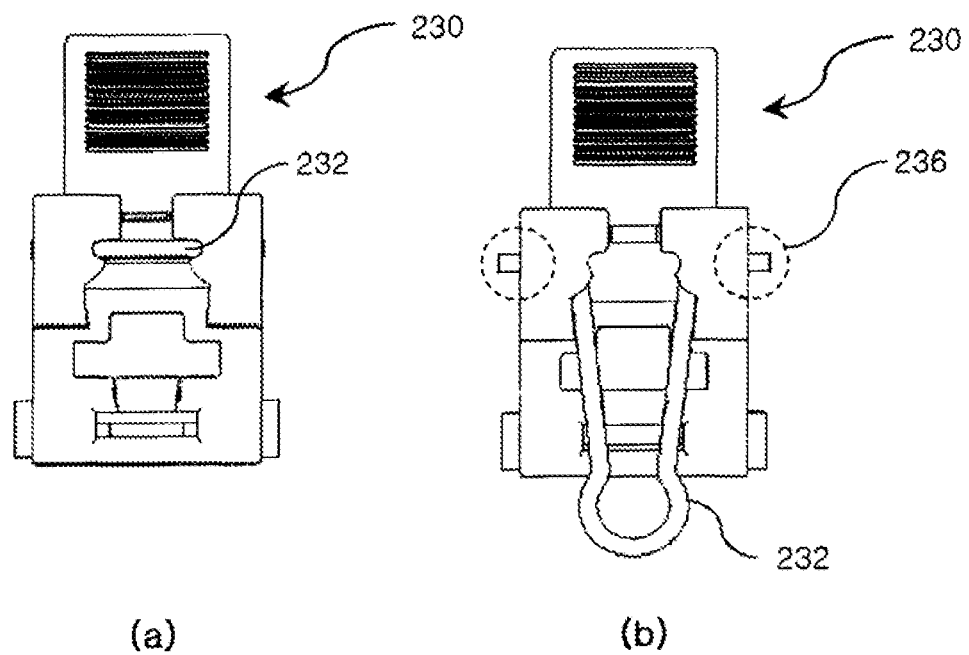
FIG. 6 is a diagram showing (a) the releasing operation of the lever 232 of the pressing unit of FIG. 5 and (b) the fastening operation thereof.

FIG. 5 is a diagram showing a pressing unit 230 of the smart junction box for a solar cell module shown in FIG. 2, and FIG. 6 is a diagram showing (a) the releasing operation of the lever 232 of the pressing unit of FIG. 5 and (b) the fastening operation thereof.

The pressing unit 230 is a spring pin-type element which functions to bring a ribbon cable 210 located on the knurling portion 221 of a bus bar 220 into contact and fastens it, or to separate it. The pressing unit 230 operates in conjunction with the bus bar 220 and enables the ribbon cable 210 to make contact at a pressure capable of preventing separation while guaranteeing its own entire surface as a current path.

As shown in FIGS. 5 and 6, the pressing unit 230 includes a rotating shaft 231 configured to be fastened to a casing formed by the body 110 and rotate within the radius it forms, an Ω-shaped lever 232 configured to bring a ribbon cable 210 into contact with or separate it from a bus bar 220 depending on rotation within the radius, a lever fastening part 233 configured to fasten the lever 232 when bringing the ribbon cable 210 into contact with the bus bar 220 and fastening it to the bus bar 220 using the pressing unit 230, and a metallic moving contact portion 235 provided on the bottom of the pressing unit 230 and configured to improve the contact reliability of the ribbon cable 210.

Furthermore, the pressing unit 230 is provided with a grip 234 for facilitating the manipulation of an operator when the ribbon cable 210 is fastened or separated, so that the ribbon cable 210 can be easily fastened or separated by the operator. In order to increase the contact reliability of the pressing unit 230 and the ribbon cable 210, that is, in order to obtain high contact pressure and a wide contact area, a plurality of protrusions is formed in the metallic moving contact, portion 235 in contact with the ribbon cable.

Here, the protrusions of the moving contact portion 235 correspond to the comb teeth-shaped depressions formed in the knurling portion 221, so that the contact reliability of the ribbon cable 210 can be achieved. The fastening and separating of the ribbon cable 210 using the lever 232 of the pressing unit 230 will now be described. With regard to the pressing unit 230, when the lever 232 is released, both ends 236 of the lever 232 are not projected to the outside, so that the pressing unit 230 is rotated within the radius, thereby releasing the ribbon cable 210 (refer to FIG. 6(a)). In contrast, when the lever 232 is fastened, both ends 236 of the lever 232 are projected to the outside and inserted into recesses formed in the body 110, thereby pressing the ribbon cable 210 and bringing it into contact (refer to FIG. 6(b)). Accordingly, the pressing unit 230 can fasten or separate the ribbon cable 210 depending on whether both ends 236 of the lever 232 are inserted into recesses formed in the body by the operation of the operator.

Figure 7:
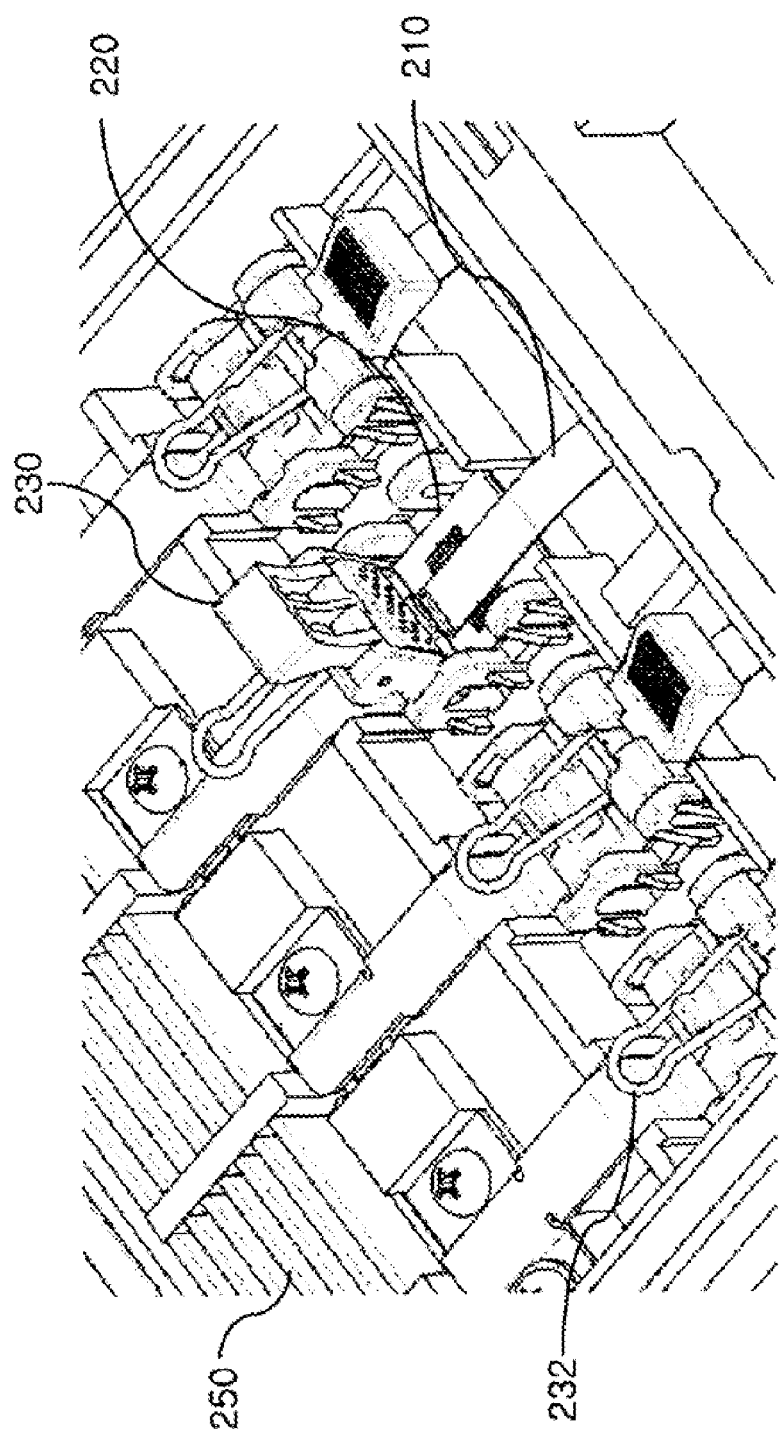
FIGS. 7 to 9 are diagrams showing the operation of the pressing unit by an operator.
Figure 8:
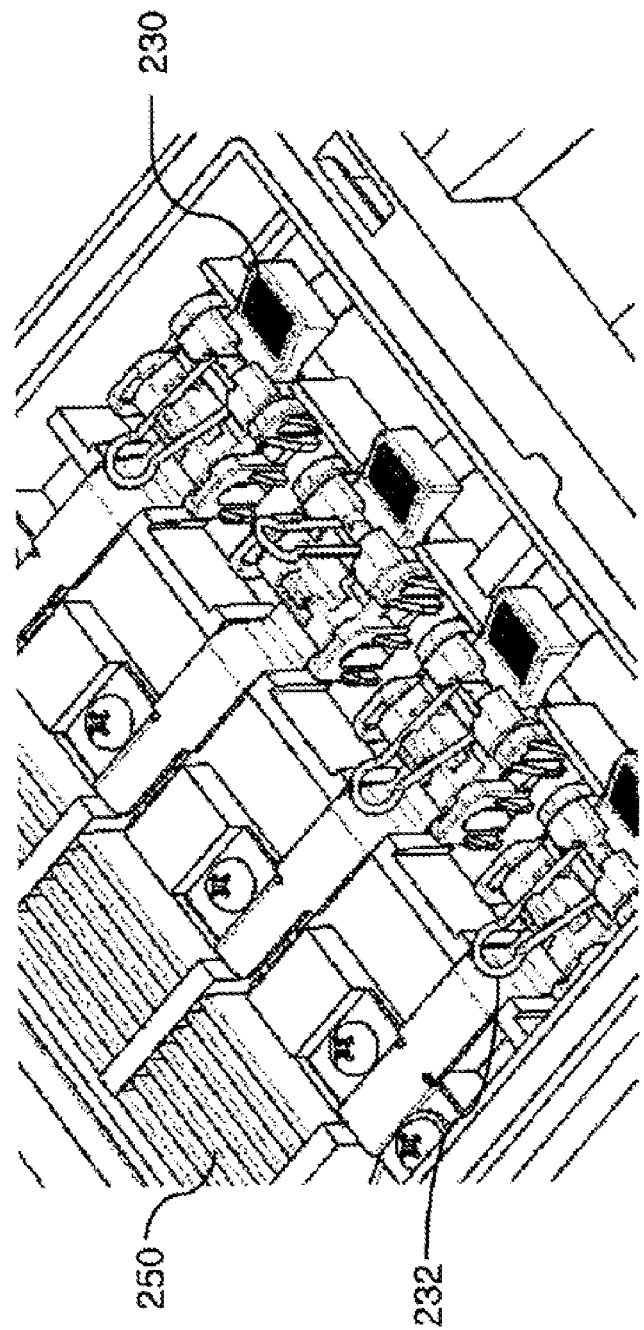
Figure 9:
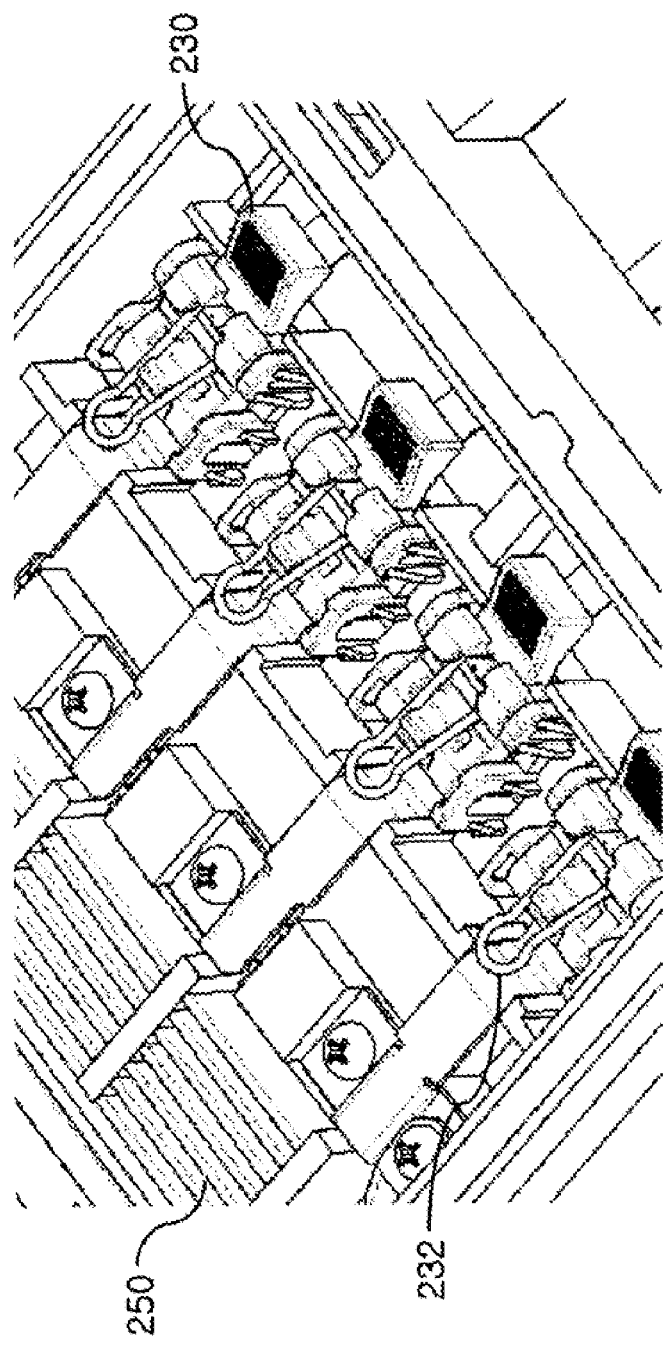

FIGS. 7 to 9 are diagrams showing the operation of a pressing unit 230 by an operator. As shown in FIGS. 7 to 9, the operator opens the pressing unit 230 by releasing the lever 232 (upwardly rotates the pressing unit 230 within the radius), and locates the ribbon cable 210 between the bus bar 220 and the moving contact portion 235 of the pressing unit (refer to FIG. 7).

Thereafter, the operator closes the pressing unit 230 by rotating it within the radius (refer to FIG. 8) and then fastens the lever 232 to the lever fastening part 233 while holding the grip 234, so that the ribbon cable 210 is brought into and fastened to the bus bar 220 using the pressing unit 230 (refer to FIG. 9). Here, the operator separates the ribbon cable 210 in the opposite order to that in which the ribbon cable 210 is fastened. As described above, the operator can easily fasten and separate the ribbon cable 210 using the pressing unit 230, FIG. 10 is a perspective view showing a diode 240 of the smart junction box for a solar cell module shown in FIG. 2, and FIGS. 11 to 14 are diagrams showing bypasses through the diodes 240 in the smart junction box for a solar cell module according to an embodiment of the present invention.

Figure 10:
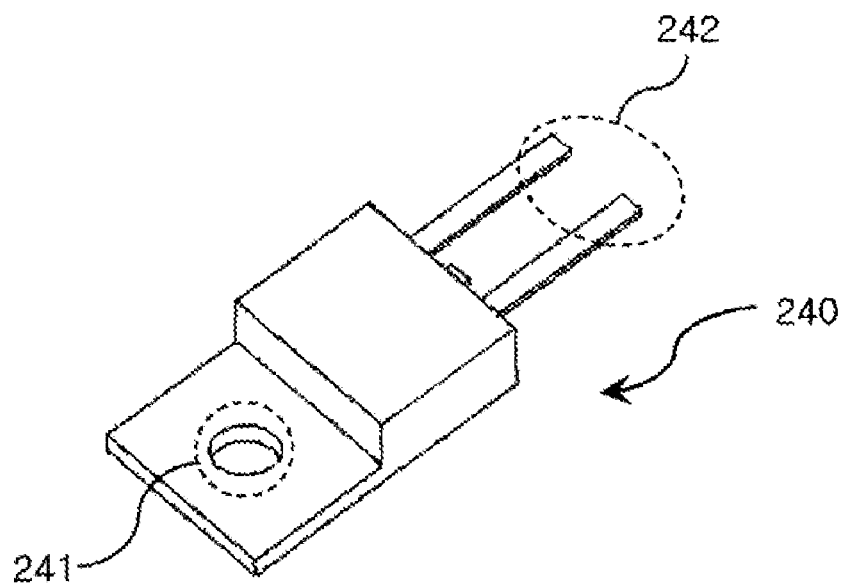
FIG. 10 is a perspective view showing a diode of the smart junction box for a solar cell module shown in FIG. 2.
Figure 11:
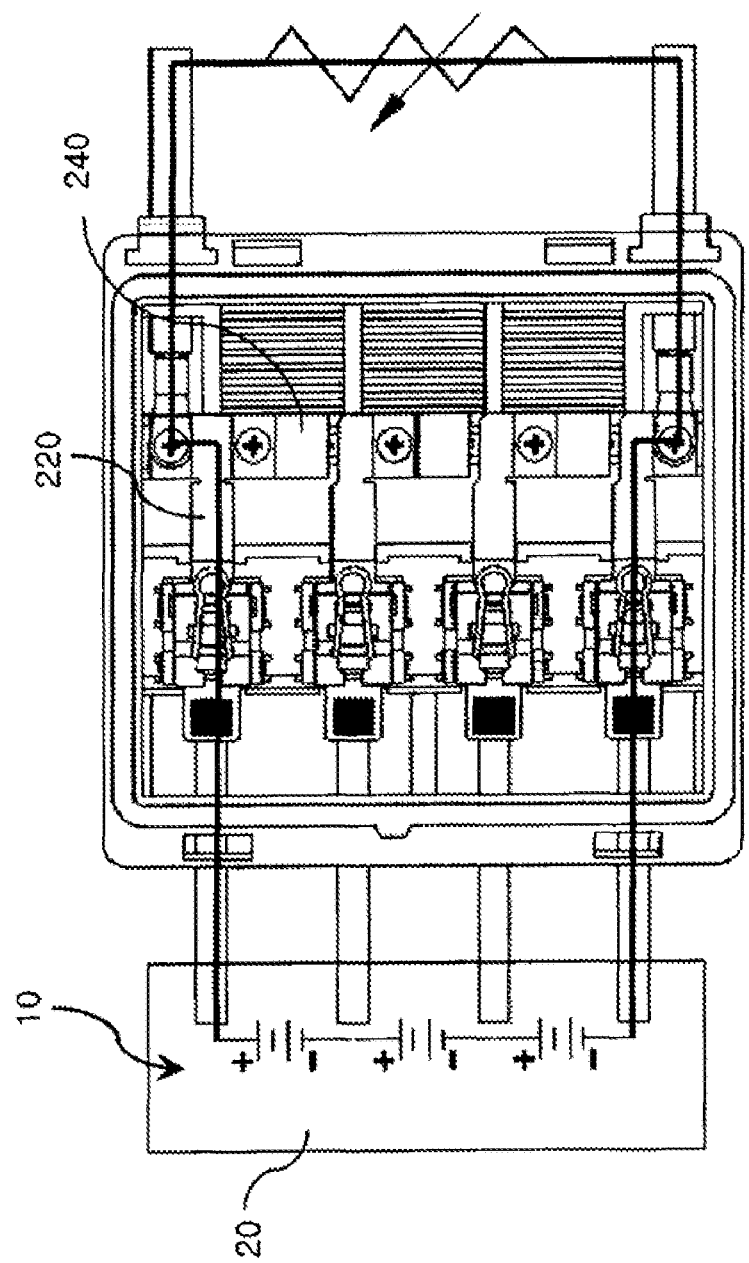
FIGS. 11 to 14 are diagrams showing bypasses through diodes in the smart junction box for a solar cell module according to an embodiment, of the present invention.

As shown in FIG. 10, the bypass diode 240 has a structure which has a hexahedral shape and in which thermally conductive metal is provided on one surface thereof, and the bypass diode 240 is disposed in contact with a bus bar 220 so that generated heat is transmitted to the bus bar 220 through the metal. Here, the bypass diode 240 is provided with a diode fastening hole 241 for supporting fastening means 260 so that the bypass diode 240 is fastened to the bus bar 220 and a heat sink plate 250 in a surface contact relationship, thereby forming a heat sink structure. Furthermore, the bypass diode 240 is provided with terminals 220 for fastening the bypass diode 240 to the bus bar 220, and the terminals 242 are placed in contact with the bus bar 220 and then fastened to the bus bar 22 using a bolt or a screw.

Figure 12:
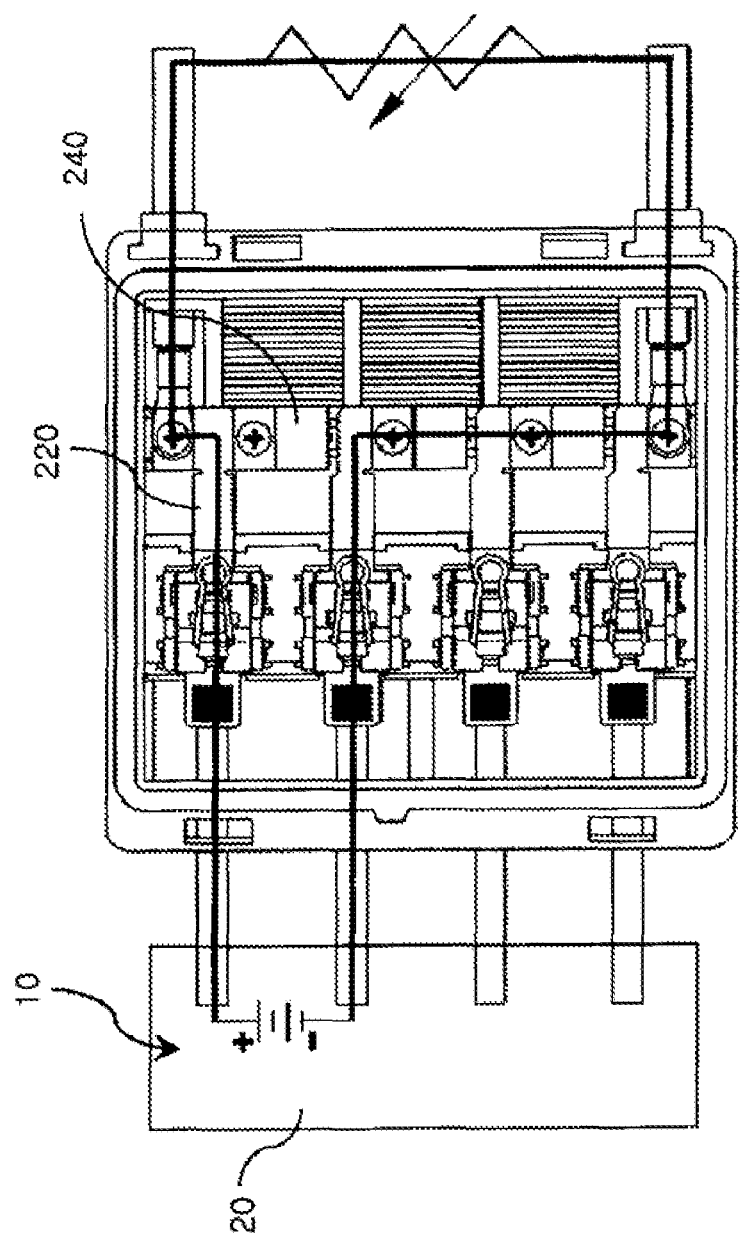
Figure 13:
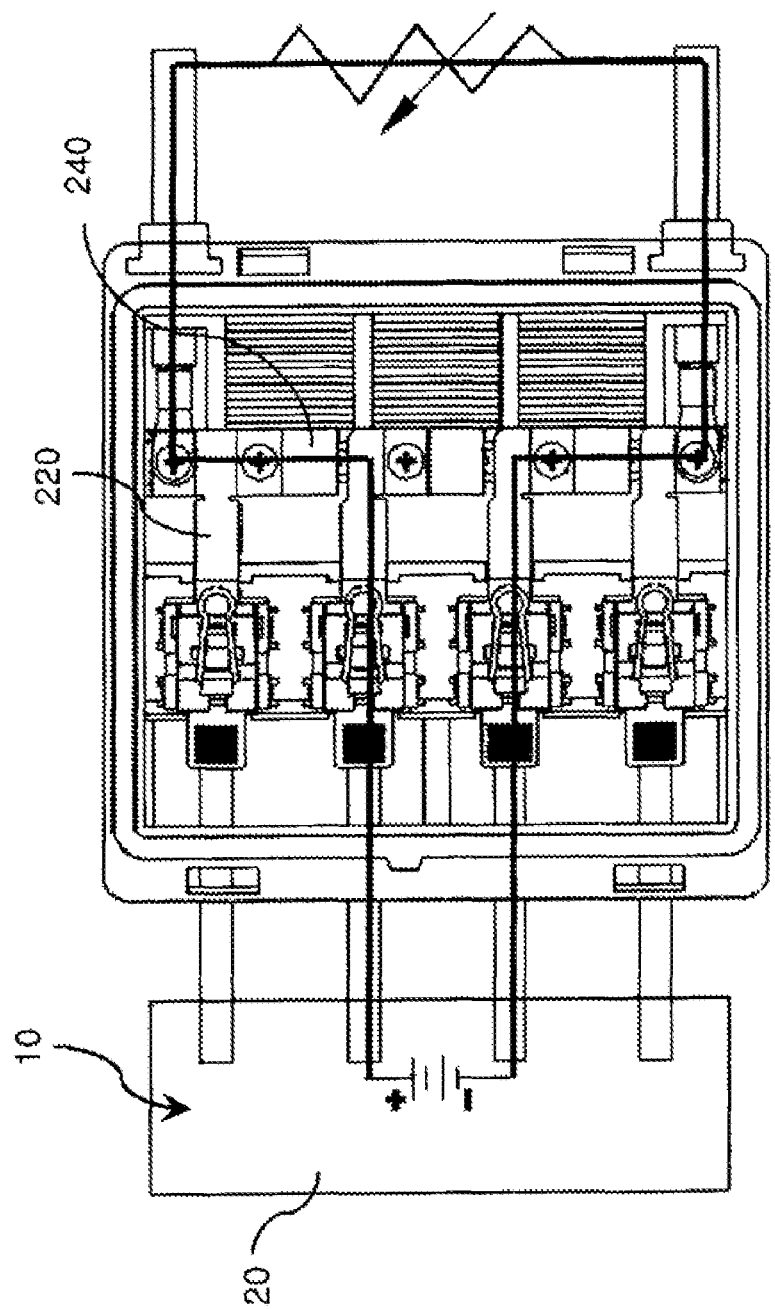
Figure 14:
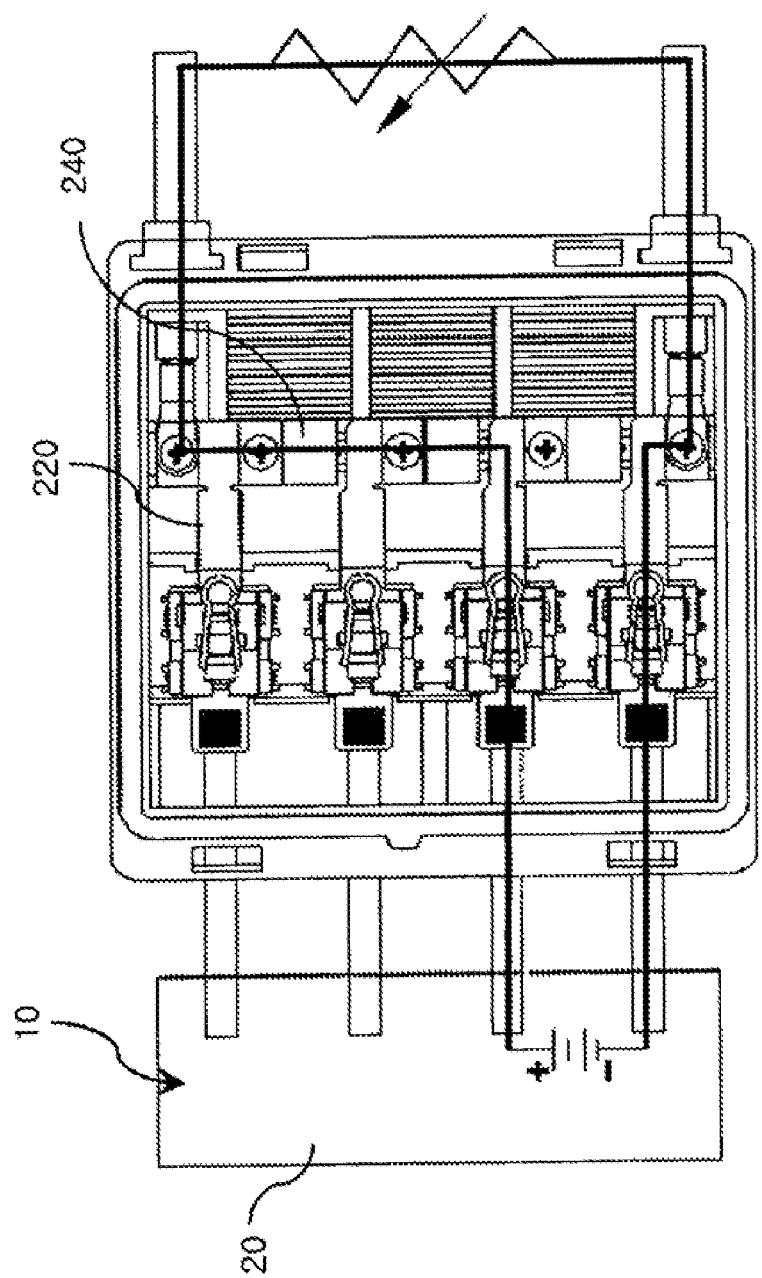

The bypass diode 240 does not operate in a normal state, and is used to form a bypass for current when an abnormality occurs in cells 20 mounted in series in the solar cell module 10 (in the present embodiment, three cells are mounted in series). That is, the bypass diode 240 does not operate when the cells 20 mounted in series in the solar cell module 10 are all normal (refer to FIG. 11). The reason for this is that electricity generated by the solar cell module does not pass through the bypass diode 240, but flows only through the bus bar 220 along a path to the external cable 130 (refer to the bold lines of FIG. 11). However, the bypass diode 240 provides a bypass for allowing electricity generated by the solar cell module to be transmitted to the external cable 130 when any cell 20 mounted in the solar ceil module 10 is abnormal (refer to the bold lines of FIGS. 12 to 14). Here, FIGS. 12 to 14 are diagrams showing the case where two cells 20 are abnormal.

Figure 15:
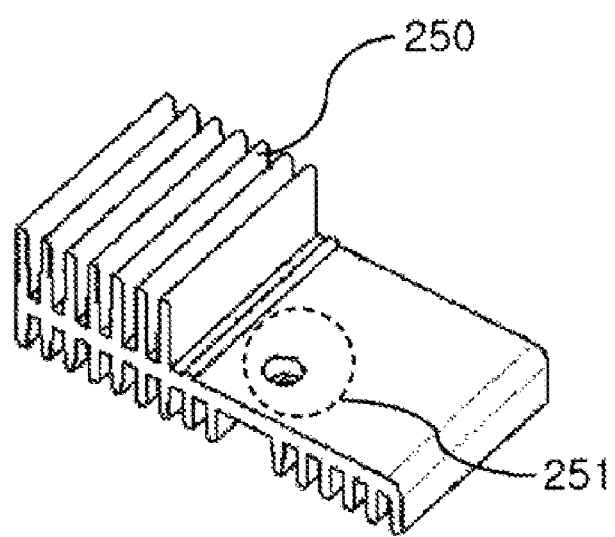
FIG. 15 is a perspective view showing a heat sink plate of the smart junction box for a solar ceil module shown in FIG. 2.

FIG. 15 is a perspective view showing a heat sink plate 250 of the smart junction box for a solar cell module shown in FIG. 2. As shown in FIG. 15, the heat sink plate 250 is fastened to a bus bar 220 and a bypass diode 240 by fastening means 260 and forms a heat sink structure, so that, the heat sink plate 250 conducts the heat generated by the ribbon cable 210 and the bypass diode 240 and emits it to the outside.

The heat sink plate 250 is provided with a heat sink plate fastening hole 251 so that the bus bar 220 and the diode 240 can be fastened by the fastening means 260. In particular, the heat sink plate 250 causes generated heat to be emitted to the outside through the through hole 122 formed in the cover 120, thereby improving the heat dissipation effect. Generally, the heat sink plate 250 is formed in a wrinkled shape to provide an area that is in contact with the air, and has high heat dissipation efficiency because it is made of a material that has high thermal conductivity.

Figure 16:
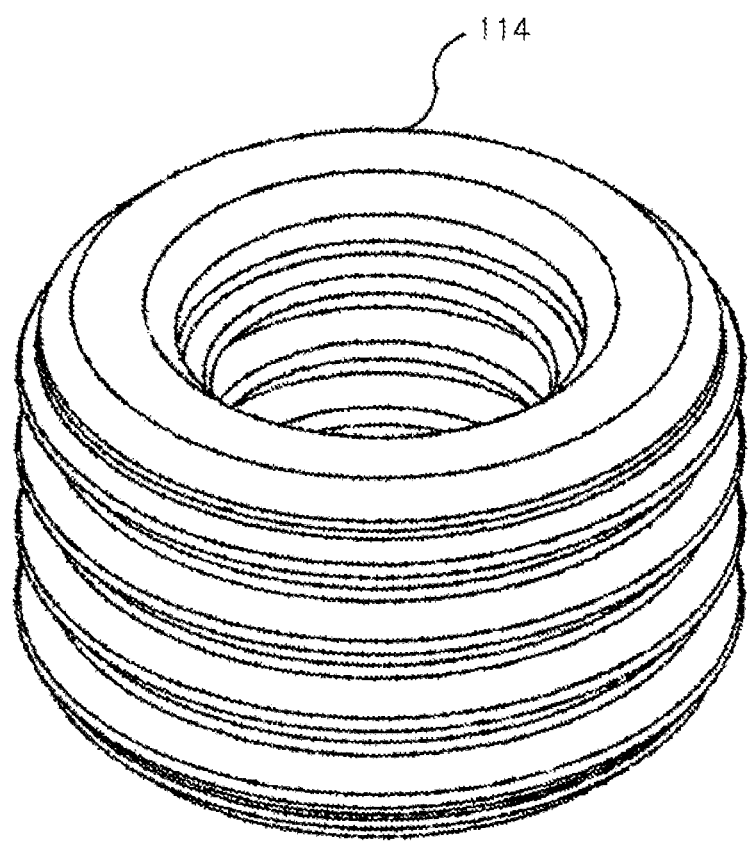
FIG. 16 is a perspective view showing a cable seal of the smart junction box for a solar ceil module according to an embodiment of the present invention.
Figure 17:
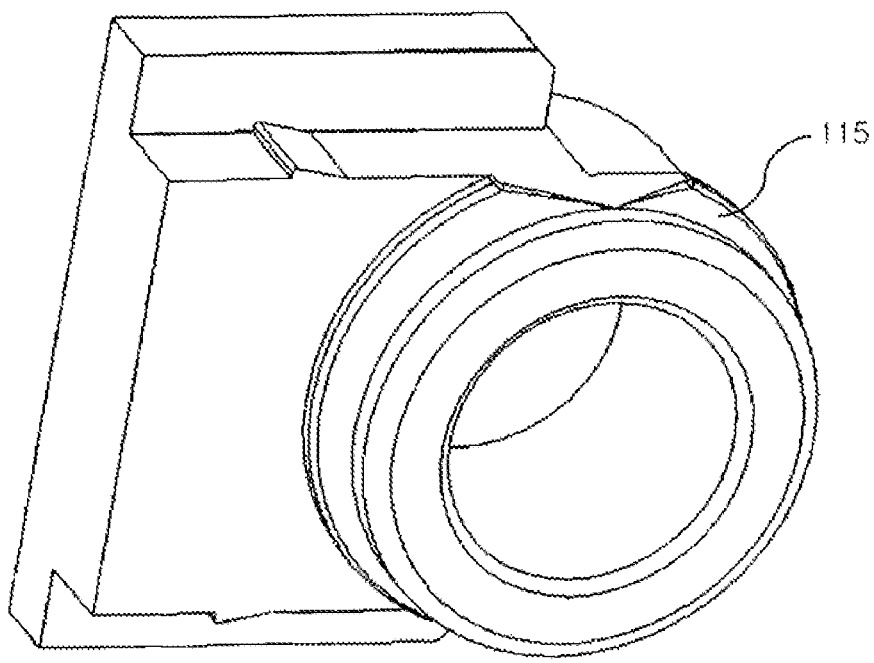
FIG. 17 is a perspective view showing a seal retainer of the smart junction box for a solar ceil module according to an embodiment of the present invention.

FIG. 16 is a perspective view showing a cable seal of the smart junction box for a solar cell module according to an embodiment of the present invention, and FIG. 17 is a perspective view showing a seal retainer of the smart junction box for a solar cell module according to an embodiment of the present invention.

As shown in FIGS. 1 and 2, the external cable 130 for providing electricity generated by the solar cell module to the outside through the ribbon cable 210 and bus bar 220 of the junction box 100 is connected to one side of the body 110. Here, an external cable connection part 113 for passing the external cable 130 therethrough and providing sealing to prevent rainwater or moisture from flowing therethrough is formed in the body 110. Here, the external cable 130 may be fitted into a ring terminal, and be fastened to the bus bar 220 inside the junction box through the through hole of the external cable connection part 113. Furthermore, the external cable connection part 113 may include a rubber cable seal 114 provided on the outer circumference of the external cable 130 to realize waterproofing (refer to FIG. 16), and a seal retainer 115 fitted on the outside of the cable seal to prevent the cable seal 114 from being separated and to keep the cable seal 114 waterproof when the external cable 130 is bent (refer to FIG. 17).

Figure 18:
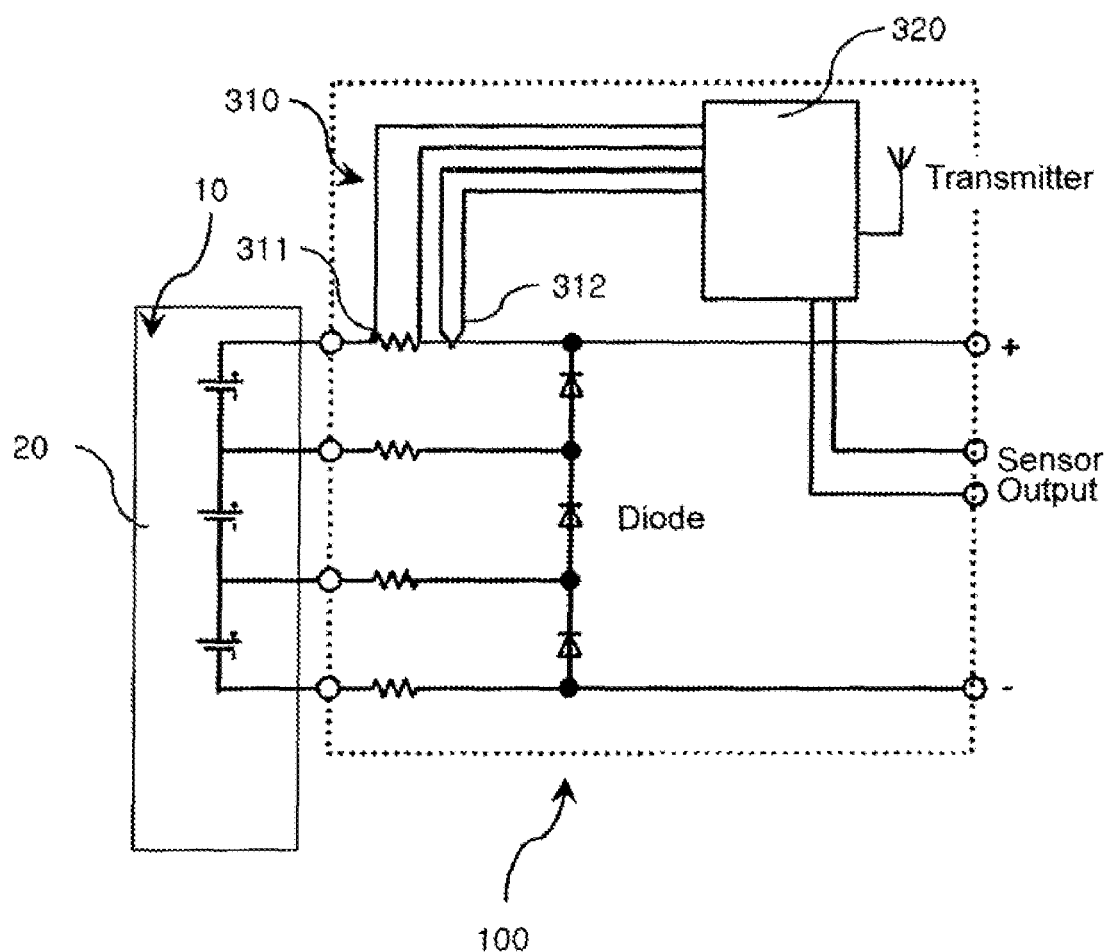
FIG. 18 is a conceptual diagram showing the operating principle for checking whether a solar cell module is abnormal in the smart junction box for a solar ceil module according to an embodiment of the present invention.

FIG. 18 is a conceptual diagram showing the operating principle for checking whether the solar cell module is abnormal in the smart junction box for a solar cell module according to an embodiment of the present invention.

As shown in the conceptual diagram of FIG. 18, the electricity of the cells 20 of the solar cell module 10 is supplied to the outside through the junction box 100. Here, data or information detected using a sensor module 310 for detecting current, voltage and temperature installed inside the junction box 100, particularly a voltage/current sensor 311 for detecting the minute resistance of the bus bar 220 and a temperature sensor 312 for detecting temperature, is reported to an administrator using a communication module 320 via wired or wireless communication, so that it can be checked whether the solar ceil module 10 is abnormal.

The above-described present invention is not limited to the above-described embodiments and the accompanying drawings because those having ordinary skill in the technical field to which the present invention pertains can make various replacements, variations and modifications within the range which does not depart from the technical spirit of the invention.

The invention claimed is:

1. A smart junction box for a solar cell module, comprising:
bus bars for transmitting electricity flowing from ribbon cables;
pressing units for selectively fastening and separating the ribbon cables located on contact portions of the bus bars;
diodes each configured to have a hexahedral shape, provided with thermally conductive metal on one surface thereof, disposed so as to be in contact with a corresponding heat sink plate in a surface contact manner, and provided with two terminals so as to be disposed in contact with a corresponding bus bar;
heat sink plates disposed in contact with the bus bars, and configured to emit heat conducted through the bus bars and the metal of the diodes to an outside;
fastening means for fastening the bus bars, the diodes and the heat sink plates to each other; and
external cables for providing electricity transmitted from the bus bars to the outside.

2. The smart junction box according to claim 1, wherein a comb-teeth shaped knurling portion is formed on a contact portion of each of the bus bars on which a corresponding ribbon cable is located so as to improve reliability of contact between the bus bar and the ribbon cable.

3. The smart junction box according to claim 1, wherein each of the ribbon cables is connected to a solar cell module, so that electricity flows from the solar cell module.

4. The smart junction box according to claim 1, wherein each of the pressing units comprises an Ω-shaped lever configured to selectively fasten or release a corresponding ribbon cable to or from a corresponding bus bar; a lever fastening part configured to fasten the lever when fastening the ribbon cable; and a metallic moving contact portion provided on a bottom of the pressing unit.

5. The smart junction box according to claim 4, wherein the pressing unit selectively fastens and separates the ribbon cable depending on whether both ends of the lever are inserted into recesses formed in a body of the smart junction box by manipulation of an operator.

6. The smart junction box according to claim 4, wherein a plurality of protrusions is formed on the metallic moving contact portion to come into contact with the ribbon cable so as to increase reliability of contact between the pressing unit and the ribbon cable.

7. The smart junction box according to claim 1, wherein the diodes provide bypasses for current transmitted from a corresponding ribbon cable to an external cable when an abnormality occurs in a cell of the solar cell module.

8. The smart junction box according to claim 1, wherein each of the external cables is fitted into a ring terminal and fastened to a corresponding bus bar through a through hole of an external cable connection part using a screw.

9. The smart junction box according to claim 1, wherein the external cable connection part comprises a rubber cable seal provided on an outer circumference of the external cable to realize waterproofing and a seal retainer fitted on an outside of the cable seal to prevent the cable seal from being separated and to keep the cable seal waterproof when the external cable is bent.

10. The smart junction box according to claim 1, further comprising a sensor module disposed inside the junction box and configured to detect current, voltage and temperature; and a communication module configured to report data detected by the sensor module to an administrator via wireless communication, the sensor module comprising a current/voltage sensor and a temperature sensor.

* * * * *